United States Patent [19]

Arabei et al.

[11] 4,067,743

[45] Jan. 10, 1978

[54] HEAT-ABSORBING MATERIAL

[76] Inventors: Boris Georgievich Arabei, ulitsa 15 Parkovaya, 42, korpus 5, kv. 57; Mark Semenovich Zukher, ulitsa B. Khmelnitskogo, 13, kv. 12; Jury Mikhailovich Markov, Khoroshevskoe shosse, 39, korpus 1, kv. 58; Galina Nikolaevna Trokhina, ulitsa Sakhalinskaya, 4, kv. 127, all of Moscow; Viktor Alexandrovich Tjurin, Pervomaisky proezd, 2A, kv.6; Iosif Isaakovich Khazanov, ulitsa Krupskoi, 9, kv. 28, both of Balashikha Moskovskoi oblasti; Pavel Fedorovich Belmer, ulitsa Osipenko, 77, kv. 68, Moscow; Ivan Ivanovich Zverev, prospekt Lenina, 8, kv. 2, Balashikha Moskovskoi oblasti, all of U.S.S.R.

[21] Appl. No.: 719,945

[22] Filed: Sept. 2, 1976

[51] Int. Cl.$^2$ .................... C04B 35/56; C04B 35/52
[52] U.S. Cl. ........................................ 106/44; 106/56
[58] Field of Search ..................... 106/44, 56

[56] References Cited

U.S. PATENT DOCUMENTS

| 2,154,271 | 4/1939 | Higgins ................................ 106/44 |
| 3,340,677 | 9/1967 | Alper et al. ........................... 106/44 |
| 3,808,012 | 4/1974 | Bailey et al. ........................ 106/44 |

Primary Examiner—Winston A. Douglas
Assistant Examiner—Mark Bell
Attorney, Agent, or Firm—Lackenbach, Lilling & Siegel

[57] ABSTRACT

A heat absorbing material comprising from 12 to 51 wt% of boron carbide, from 7 and 22 wt % of silicon carbide, from 1 and 10 wt % of copper, from 1 and 12 wt % of titanium diboride and from 79 and 5 wt % of carbon.

The heat absorbing material disclosed displays the requisite thermophysical properties, high heat resistance and low density. The thermal conductivity of the material is from 82 and 37 W/m. deg over the range of temperatures from 20 and 1000° C, the specific heat is from 0.94 and 1.74 kJ/kg deg at temperatures varying from 20 and 600° C and the density of the material is from 2.32 and 2.50 g/cm$^3$.

6 Claims, No Drawings

HEAT-ABSORBING MATERIAL

The present invention relates to heat absorbing materials which find wide application in braking devices of various means of transportation for example, in landing gear of aircraft.

A marked increase in the takeoff and landing speeds witnessed in recent years along with the growing takeoff weight of aircraft poses the problem of developing such heat absorbing materials for the landing gear, the aircraft disc brakes in particular, which are capable of absorbing heat energy in huge amounts during the landing run. It is desirable that these materials have the least possible density. The materials used in modern aircraft engineering fail to meet the requirements of thermophysical properties as well as weight. This is exemplified by the fact that an increase in the working temperature of the brake material impairs the brakes's performance thereby necessitating an increase in the volume of the heat absorbents used. This leads to an increase in the weight and overall dimensions of the whole arrangement. So, there is a need for heat absorbing materials meeting the requirements they should meet and effecting savings in the weight of the product made therefrom. In service, such heat absorbing material must absorb heat energy in great amounts during the period of braking which is of rather short duration. The brake discs of an aircraft landing gear absorb, for example, as much as 70 to 98% of the braking energy in the course of applying the brakes. This is why heat absorbing materials must meet the following requirements:

1. high specific heat;
2. high allowable service temperature;
3. high heat resistance;
4. high thermal conductivity;
5. low density.

There are known graphite based heat absorbing materials used in aircraft brakes. This applies to the heat absorbing material for brake discs based on graphite and reinforced with carbon fibre (Aviation week and Space Technology 1970, v.93, No.29, p.17).

Said materials have the following disadvantages:

1. low specific heat failing to provide for the requisite heat absorption necessitating of a substantial increase in the volume of the arrangement;
2. high porosity of the material impairing its thermal conductivity and rendering the material sensitive to moisture;
3. low heat resistance of the material reducing the allowable service temperature.

Moreover, the cost of the material reinforced with carbon fibre is 9.8 times more than that of the brake as a whole, and the cost of a brake disc is 17.1 times more than that of a brake disc made from the material commonly used.

Also known in the art is a heat absorbing material for brakes comprising from 10 to 50 wt % of boron carbide, from 3 and 3.5 wt % of a metal from the iron group, between 1 to 5 wt % of boron nitride and from 10 to 86 wt % of zirconium carbide. Said material compares favorably with the heat absorbing carbide based on graphite and reinforced with graphite fibre in terms of thermal conductivity which is 48.1 to 27.3 W/m. deg over the range of temperatures from 20 to 800° C, and in terms of thermal capacity which is 0.561 to 0.708 kJ/kg.deg within the range of temperatures of 20° to 800° C but also suffers from drawbacks. Its density is too high and the thermal conductivity too low to make the material suitable for use in arrangements intended to absorb much thermal energy and combine low weight with low volume.

It is the object of the present invention to provide a heat absorbing material exhibiting the requisite thermophysical properties, i.e., high thermal conductivity and high thermal capacity, low specific gravity, high service temperature and heat resistance.

In accordance with said and other objects, the present invention consists of a heat absorbing material, containing boron carbide. Said material also contains, according to the invention, silicon carbide, copper, titanium diboride and carbon, and components being taken in the following amounts:

boron carbide, from 12 to 51 wt %;
silicon carbide, from 7 to 22 wt %;
copper, from 1 t 10 wt %;
titanium diboride, from 1 to 12 wt %;
carbon from 79 to 5 wt %;

The components referred to above, if taken in the amounts specified, assure all those properties a heat absorbing material should possess. Introducing boron carbide into the material composition provides the necessary heat capacity, but under 12 wt % is not sufficient to assure the requisite thermal capacity thereof, whereas the content of boron carbide in excess of 51 wt % is of no practical value, reducing thermal conductivity and impairing processability of the material. Silicon carbide increases heat resistance and thermal conductivity. Silicon carbide in an amount less than 7 wt % does not increase heat resistance and thermal conductivity, yet it is impractical to increase the silicon carbide content beyond 22 wt % for the obvious reason that no further increase in heat resistance is observed. Copper in an amount from 1 to 10 wt % also improves thermal conductivity and processability of the material, but a higher copper content is not desirable, bringing about evaporation of copper in the course of processing. Titanium diboride inhibits the porosity of the material and improves processability, the most favorable proportion of titanium diboride in the material being from 1 to 12 wt %. Carbon in the form of graphite is the ingredient to which the material owes its low density combined with high thermal conductivity, and the carbon content depends on the amounts in which the rest of components are taken.

It is recommended that heat absorbing materials of the following compositions should preferably be used:

79 wt % carbon, 12 wt % of boron carbide, 7 wt % of silicon carbide, 1 wt % of copper, and 1 wt % of titanium diboride;

5 wt % of carbon, 51 wt % of boron carbide, 22 wt % of silicon carbide, 10 wt % of copper, and 12 wt % of titanium diboride 31 wt % of carbon, 48 wt % of boron carbide, 14 wt % of silicon carbide, 5 wt % of copper, and 2 wt % of titanium diboride;

24 wt % of carbon, 51 wt % of boron carbide, 14 wt % of silicon carbide, 5 wt % of copper and 6 wt % of titanium diboride;

51 wt % of carbon, 20 wt % of boron carbide, 18 wt % of silicon carbide, 1 wt % of copper, and 10 wt % of titanium diboride.

The heat absorbing material proposed herein exhibits desirable thermo physical properties. Its thermal conductivity is 82 to 37 W/m.deg over the range of temperatures from 20° to 1000° C, the specific heat of the material varies from 0.94 to 1.75 kJ/kg.deg over the range of temperatures of 20° to 600 C, and the heat resistance is 22 to 28 mg/cm² within an interval of 100 hr at 800° C. The density of the heat absorbing material is as low as 2.32 to 2.50 g/cm³.

The heat absorbing material of the invention is prepared in the following way.

Pulverized boron carbide, silicon carbide, copper, titanium diboride and carbon, taken in the amounts selected, are intermixed in ethyl alcohol until a viscous homogenous mass is obtained which is then dried at a temperature between 100° and 120° C for 1.5 to 2 hours. The dry stock is press moulded at a temperature from 1950° to 2300° C under a pressure of 350 to 400 kg/cm² for a period lasting from 20 to 60 minutes, using graphite moulds. On being removed from the moulds, the samples can be machined, using grinding wheels or diamond tools. The grinding speed is from 25 to 30 m/sec and depth of grinding is 0.03 to 0.05 mm.

The present invention will be best understood from the following particular examples.

EXAMPLE 1

79 wt % of carbon, 12 wt % of boron carbide, 7 wt % of silicon carbide, 1 wt % of copper and 1 wt % of titanium diboride, all taken in pulverized form, are intermixed in ethyl alcohol until a viscous homogenous mass is obtained. The stock is dried at 120° C for 1.5 hours and then press-moulded in graphite moulds at a temperature of 2200°±30° C under a pressure of 400 kg/cm² for a period lasting 50 minutes. The material thus obtained is ground at a speed of 30 m/sec, depth of grinding being 0.05 mm.

The material displays the following properties:
density 2.32 g/cm³;
specific heat over the range of temperatures from 20° to 600° C, from 0.94 to 1.67 kJ/kg.deg;
thermal conductivity over the range of temperature from 20° to 1000° C, from 82 to 43 W/m.deg;
ultimate bending strength at 20° C, 8 kg/mm²;
ultimte compression strength at 20° C, 18 1 kg/mm².

EXAMPLE 2

The heat absorbing material produced is of the following composition: 5 wt % of carbon, 51 wt % of boron carbide, 22 wt % of silicon carbide, 10 wt % of copper and 12 wt % of titanium diboride. The processing technique is the same as in Example 1 with the only difference that the stock drying temperature is 100° C, the drying period is 2 hours, the press-moulding temperature is 2000°±30° C, the moulding pressure is 400 kg/cm² and the moulding interval, 60 min. The material displays the following properties:
density, 2.50 g/cm³;
specific heat over the range of temperature from 20° to 600° C, from 0.98 to 1.72 kJ/kg.deg;
thermal conductivity over the range of temperatures from 20° to 1000° C, from 68 to 39 W/m deg;
ultimate bending strength at 20° C, 12 kg/mm²;
ultimate compression strength at 20° C, 24 kg/mm².

EXAMPLE 3

The heat absorbing material produced is of the following composition: 31 wt % of carbon, 48 wt % of boron carbide, 14 wt % of silicon carbide, 5 wt % of copper and 2 wt % of titanium diboride. The material is produced according to the technique outlined in Example 1 and the conditions of the process are as follows: stock drying temperature, 120° C; drying period, 1.5 hours; press-moulding temperature, 2100°±30° C; moulding pressure, 350 kg/cm²; moulding period 30 min. The material displays the following properties:
density, 2.39 g/cm³;
Specific heat over the range of temperatures from 20° to 600° C, from 0.96 to 1.70 kJ/kg deg;
thermal conductivity over the range of temperatures from 20° and 1000° C, from 71.5 to 40 W/m deg;
ultimate bending strength at 20° C, 11 kg/mm²;
ultimate compression strength at 20° C, 21 kg/mm².

EXAMPLE 4

The heat absorbing material produced has the following composition: 24 wt % of carbon, 51 wt % of boron carbide, 14 wt % of silicon carbide, 5 wt % of copper and 6 wt % of titanium diboride. The material is produced by employing the technique outlined in Example 1 under the following conditions: stock drying temperature, 120° C; drying period 1.5 hours; press-moulding temperature, 2200°±30° C, moulding pressure 350 kg/cm², moulding period, 60 min. The material displays the following properties:
density, 2.47 g/cm³;
specific heat over the range of temperatures between 20° and 600° C, between 0.99 and 1.74 kJ/kg deg;
thermal conductivity over the range of temperatures from 20° to 1000° C, from 65 to 37.5 W/mdeg;
ultimate bending strength at 20° C, 14 kg/mm²;
ultimate compression strength at 20° C, 26 kg/mm².

EXAMPLE 5

The heat absorbing material produced is of the following composition: 51 wt % of carbon, 20 wt % of boron carbide, b 18 wt % of silicon carbide, 1 wt % of copper and 10 wt % of titanium diboride. The material is produced by employing the technique described in Example 1 under the following conditions: press-moulding temperature 2150°±30° C; moulding pressure, 400 kg/cm²; moulding period, 50 min. The material displays the following properties:
density, 2.34 g/cm³;
specific heat over the range of temperatures from 20° to 600° C, from 0.95 to 1.68 kJ/kg deg;
thermal conductivity over the range of temperatures from 20° to 1000° C, from 77 to 42 W/m deg;
ultimate bending strength, 9 kg/mm²;
ultimate compression strength, 20 kg/mm².

What is claimed is:

1. A heat absorbing material comprising from 12 to 51 wt % of boron carbide, from 7 to 22 wt % of silicon carbide, from 1 to 10 wt % of copper, from 1 to 12 wt % of titanium diboride and from 79 to 5 wt % of carbon.

2. A heat absorbing material as claimed in claim 1, containing 79 wt % of carbon, 12 wt % of boron carbide, 7 wt % of silicon carbide, 1 wt % of copper, and 1 wt % of titanium diboride.

3. A heat absorbing material as claimed in claim 1, containing 5 wt % of carbon, 51 wt % of boron carbide, 22 wt % of silicon carbide, 10 wt % copper, and 12 wt % of titanium diboride.

4. A heat absorbing material as claimed in claim 1, containing 31 wt % of carbon, 48 wt % of boron carbide, 14 wt % of silicon carbide, 5 wt % of copper, and 2 wt % of titanium diboride.

5. A heat absorbing material as claimed in claim 1, containing 24 wt % of carbon, 51 wt % of boron carbide, 14 wt % of silicon carbide, 5 wt % of copper, and 6 wt % of titanium diboride.

6. A heat absorbing material as claimed in claim 1, containing 51 wt % of carbon, 20 wt % of boron carbide, 18 wt % of silicon carbide, 1 wt % of copper, and 10 wt % of titanium diboride.

* * * * *